(12) United States Patent
Chang

(10) Patent No.: US 12,026,969 B2
(45) Date of Patent: Jul. 2, 2024

(54) FINGERPRINT RECOGNITION DEVICE, READOUT CIRCUIT AND OPERATING METHOD OF FINGERPRINT RECOGNITION DEVICE

(71) Applicant: Novatek Microelectronics Corp., Hsinchu (TW)

(72) Inventor: Kuei-Chung Chang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/863,409

(22) Filed: Jul. 13, 2022

(65) Prior Publication Data

US 2023/0162526 A1   May 25, 2023

Related U.S. Application Data

(60) Provisional application No. 63/282,661, filed on Nov. 23, 2021.

(51) Int. Cl.
*G06V 40/13* (2022.01)

(52) U.S. Cl.
CPC ............................... *G06V 40/1318* (2022.01)

(58) Field of Classification Search
None
See application file for complete search history.

(56) References Cited

U.S. PATENT DOCUMENTS

| | | | |
|---|---|---|---|
| 10,755,065 B2 | 8/2020 | Wu et al. | |
| 10,984,217 B2 | 4/2021 | Lin et al. | |
| 11,048,909 B2 | 6/2021 | Lin et al. | |
| 2020/0097697 A1 | 3/2020 | Lin et al. | |
| 2020/0097700 A1 | 3/2020 | Lin et al. | |
| 2020/0175248 A1 | 6/2020 | Wu et al. | |
| 2020/0275001 A1 | 8/2020 | Jhang et al. | |
| 2020/0312936 A1* | 10/2020 | Lius | H01L 27/3262 |
| 2021/0297612 A1* | 9/2021 | Gallardo | H01L 29/24 |
| 2021/0342568 A1* | 11/2021 | Huang | G06V 40/50 |

FOREIGN PATENT DOCUMENTS

| | | |
|---|---|---|
| CN | 110232356 | 9/2019 |
| CN | 111259715 | 6/2020 |
| TW | 202134937 | 9/2021 |

OTHER PUBLICATIONS

"Office Action of Taiwan Counterpart Application," issued on Feb. 21, 2023, p. 1-p. 8.

* cited by examiner

*Primary Examiner* — Joseph R Haley
(74) *Attorney, Agent, or Firm* — JCIPRNET

(57) ABSTRACT

A fingerprint recognition device including a sensor panel, a readout circuit and a host circuit is provided. The sensor panel includes a plurality of sensor pixels arranged in an array. The sensor pixels are configured to output sensing signals. The readout circuit is coupled to the sensor pixels. The readout circuit is configured to read out the sensing signals from the sensor pixels after a first exposure period to obtain a first fingerprint image, and read out the sensing signals after a second exposure period to obtain a second fingerprint image. The sensor pixels are reset before the first exposure period and after the second exposure period. The host circuit is coupled to the readout circuit. The host circuit is configured to perform a fingerprint recognition operation according to the first fingerprint image or the second fingerprint image.

24 Claims, 16 Drawing Sheets

FINGERPRINT RECOGNITION DEVICE, READOUT CIRCUIT AND OPERATING METHOD OF FINGERPRINT RECOGNITION DEVICE

CROSS-REFERENCE TO RELATED APPLICATION

This application claims the priority benefit of U.S. Provisional application Ser. No. 63/282,661, filed on Nov. 23, 2021. The entirety of the above-mentioned patent application is hereby incorporated by reference herein and made a part of this specification.

BACKGROUND

Technical Field

The invention relates to an electronic device, an electronic circuit and an operating method, more specifically, a fingerprint recognition device, a readout circuit and an operating method of the fingerprint recognition device.

Description of Related Art

Fingerprint recognition is a commonly used technology for security protection. A complete sensing cycle of an optical fingerprint sensor includes actions such as reset, exposure (exposure of the photosensitive element in the optical fingerprint sensor), and readout. Different lengths of exposure time should be applied for different fingerprint sensing conditions. For example, a fingerprint sensing under strong light requires a short exposure time to avoid overexposure of the fingerprint sensor. In the case of dry fingers, longer exposure times are required to accumulate images.

Therefore, in the traditional operation, when the fingerprint image obtained by the first fingerprint sensing is not suitable for identification. For example, it is determined to be an overexposed image, a host circuit will adjust the exposure time length, and perform fingerprint sensing again. The fingerprint image obtained by the second fingerprint sensing is re-identified. As a result, the time required for unlocking the electronic device becomes longer.

SUMMARY

The invention is direct to a fingerprint recognition device, a readout circuit and an operating method of the fingerprint recognition device, capable of saving an unlocking time.

An embodiment of the invention provides a fingerprint recognition device including a sensor panel, a readout circuit and a host circuit. The sensor panel includes a plurality of sensor pixels arranged in an array. The sensor pixels are configured to output sensing signals. The readout circuit is coupled to the sensor pixels. The readout circuit is configured to read out the sensing signals from the sensor pixels after a first exposure period to obtain a first fingerprint image, and read out the sensing signals after a second exposure period to obtain a second fingerprint image. The sensor pixels are reset before the first exposure period and after the second exposure period. The host circuit is coupled to the readout circuit. The host circuit is configured to perform a fingerprint recognition operation according to the first fingerprint image or the second fingerprint image.

In an embodiment of the invention, the readout circuit includes an analog-to-digital converter (ADC) circuit. The ADC circuit is coupled to the sensor pixels. The ADC circuit is configured to convert the sensing signals from an analog format to a digital format, and output the sensing signals of the digital format. The sensing signals of the digital format include a first data and a second data. The first data corresponds to the first fingerprint image, and the second data corresponds to the second fingerprint image.

In an embodiment of the invention, the ADC circuit has different parameter settings for different lengths of exposure periods.

In an embodiment of the invention, the host circuit is configured to set the parameter settings of the analog-to-digital converter circuit according to the lengths of the exposure periods.

In an embodiment of the invention, the readout circuit further includes a first storage device. The first storage device is coupled to the ADC circuit. The first storage device is configured to receive and store the sensing signals of the digital format.

In an embodiment of the invention, the host circuit includes a second storage device. The second storage device is coupled to the readout circuit. The second storage device is configured to receive and store the sensing signals of the digital format.

In an embodiment of the invention, the fingerprint recognition device further includes a driver circuit. The driver circuit is coupled to the sensor pixels. The driver circuit is configured to reset the sensor pixels and scan the sensor pixels to drive the sensor pixels to output sensing signals. The driver circuit resets the sensor pixels before the first exposure period and after the second exposure period.

In an embodiment of the invention, the driver circuit includes a scan circuit and a gate driving circuit. The scan circuit is coupled to the sensor pixels. The scan circuit is configured to reset the sensor pixels and scan the sensor pixels to drive the sensor pixels to output the sensing signals. The gate driving circuit is coupled to the scan circuit. The gate driving circuit is configured to drive the scan circuit to perform a reset operation and a scan operation.

In an embodiment of the invention, the scan circuit is disposed on the sensor panel, and the gate driving circuit is disposed in the readout circuit.

In an embodiment of the invention, the readout circuit is implemented in a semiconductor chip which has a display driving function, a touch sensing function and a fingerprint sensing function.

An embodiment of the invention provides a readout circuit configured to read out sensing signals from sensor pixels of a sensor panel. The readout circuit includes an ADC circuit and a driver circuit. The ADC circuit is coupled to the sensor pixels. The ADC circuit is configured to receive the sensing signals from the sensor pixels after a first exposure period and after a second exposure period. The ADC circuit is further configured to convert the sensing signals from an analog format to a digital format, and output the sensing signals of the digital format. The driver circuit is coupled to the sensor pixels. The driver circuit is configured to reset the sensor pixels and scan the sensor pixels to drive the sensor pixels to output the sensing signals. The driver circuit resets the sensor pixels before the first exposure period and after the second exposure period.

In an embodiment of the invention, the readout circuit further includes a storage device. The storage device is coupled to the analog-to-digital circuit. The storage device is configured to receive and store the sensing signals of the digital format.

An embodiment of the invention provides an operating method of a fingerprint recognition device. The fingerprint recognition device includes a sensor panel, and the sensor panel includes a plurality of sensor pixels configured to output sensing signals. The operating method of the fingerprint recognition device includes: reading out the sensing signals from the sensor pixels after a first exposure period to obtain a first fingerprint image; reading out the sensing signals from the sensor pixels after a second exposure period to obtain a second fingerprint image; and performing a fingerprint recognition operation according to the first fingerprint image or the second fingerprint image, wherein the sensor pixels are reset before the first exposure period and after the second exposure period.

In an embodiment of the invention, the fingerprint recognition device includes a readout circuit. The operating method of the fingerprint recognition device further includes: converting, via an ADC converter of the readout circuit, the sensing signals from an analog format to a digital format, and outputting the sensing signals of the digital format. The sensing signals of the digital format include a first data and a second data. The first data corresponds to the first fingerprint image, and the second data corresponds to the second fingerprint image.

In an embodiment of the invention, the operating method of the fingerprint recognition device further includes: setting parameter settings of the ADC converter circuit according to lengths of exposure periods.

In an embodiment of the invention, the operating method of the fingerprint recognition device further includes: storing the sensing signals of the digital format in a first storage device of the readout circuit.

In an embodiment of the invention, the fingerprint recognition device includes a host circuit. The operating method of the fingerprint recognition device further includes: storing the sensing signals of the digital format in a second storage device of the host circuit.

In an embodiment of the invention, the operating method of the fingerprint recognition device further includes resetting the sensor pixels before the first exposure period and after the second exposure period, and scanning the sensor pixels to drive the sensor pixels to output sensing signals.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
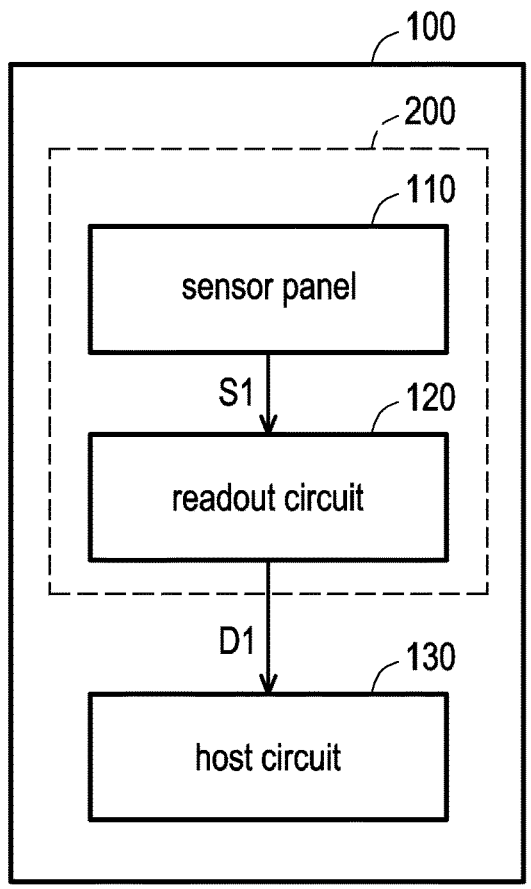
FIG. 1 is a schematic diagram of a fingerprint recognition device according to an embodiment of the invention.

FIG. 1 is a schematic diagram of a fingerprint recognition device according to an embodiment of the invention. Referring to FIG. 1, the fingerprint recognition device 100 of the present embodiment includes a sensor panel 110, a readout circuit 120 and a host circuit 130. The sensor panel 110 and the readout circuit 120 may serve as a fingerprint sensing device 200 to sense fingerprint images and output sensing data D1 to the host circuit 130. The sensing data D1 may include fingerprint image information for fingerprint recognition.

To be specific, the sensor panel 110 is configured to output sensing signals S1 to the readout circuit 120. The readout circuit 120 is coupled to the sensor panel 110 via sensing lines, for example. The readout circuit 120 is configured to read out the sensing signals S1 from the sensor panel 110 during a readout period. The host circuit 130 is coupled to the readout circuit 120. The host circuit 130 is configured to perform a fingerprint recognition operation, e.g. an unlock operation of an electronic device, according to at least one fingerprint image. For example, the host circuit 130 may be an application processor of a smartphone and configured to perform an unlock operation of the smartphone according to a correct fingerprint image.

In an embodiment, the fingerprint recognition device 100 may be an electronic device having a display function, a touch sensing function and/or a fingerprint sensing function. In an embodiment, the fingerprint recognition device 100 may be, but not limited to, a smartphone, a non-smart phone, a wearable electronic device, a tablet computer, a personal digital assistant, a notebook and other portable electronic devices that can operate independently and have the display function, the touch sensing function and the fingerprint sensing function. In an embodiment, the fingerprint recognition device 100 may be, but not limited to, a portable or un-portable electronic device in a vehicle intelligent system. In an embodiment, the fingerprint recognition device 100 may be, but not limited to, intelligent home appliances such as, a television, a computer, a refrigerator, a washing machine, a telephone, an induction cooker, a table lamp and so on.

Figure 2:
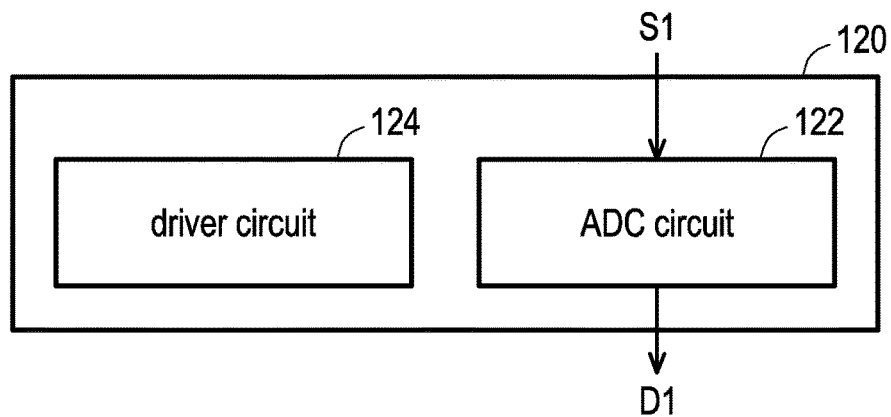
FIG. 2 is a schematic diagram of a readout circuit according to an embodiment of the invention.

FIG. 2 is a schematic diagram of a readout circuit according to an embodiment of the invention. Referring to FIG. 2, the readout circuit 120 of the present embodiment includes an analog-to-digital converter (ADC) circuit 122 and a driver circuit 124.

To be specific, the ADC circuit 122 is coupled to the sensor panel 110 via the sensing lines. The ADC circuit 122 is configured to receive the sensing signals S1 from the sensor panel 110, convert the sensing signals S1 from an analog format to a digital format, and output the sensing signals in the digital format, e.g. the sensing data D1. The driver circuit 124 is coupled to the sensor panel 110. The driver circuit 124 is configured to reset sensor pixels of the sensor panel 110, and scan the sensor pixels to drive the sensor pixels to output the sensing signals S1.

In an embodiment, the readout circuit 120 may further include a digital circuit, an analog front end (AFE) circuit and/or other functional circuits for performing a fingerprint sensing operation. In addition, enough teaching, suggestion, and implementation illustration for hardware structures of the ADC circuit 122 and the driver circuit 124 can be obtained with reference to common knowledge in the related art.

Figure 3:
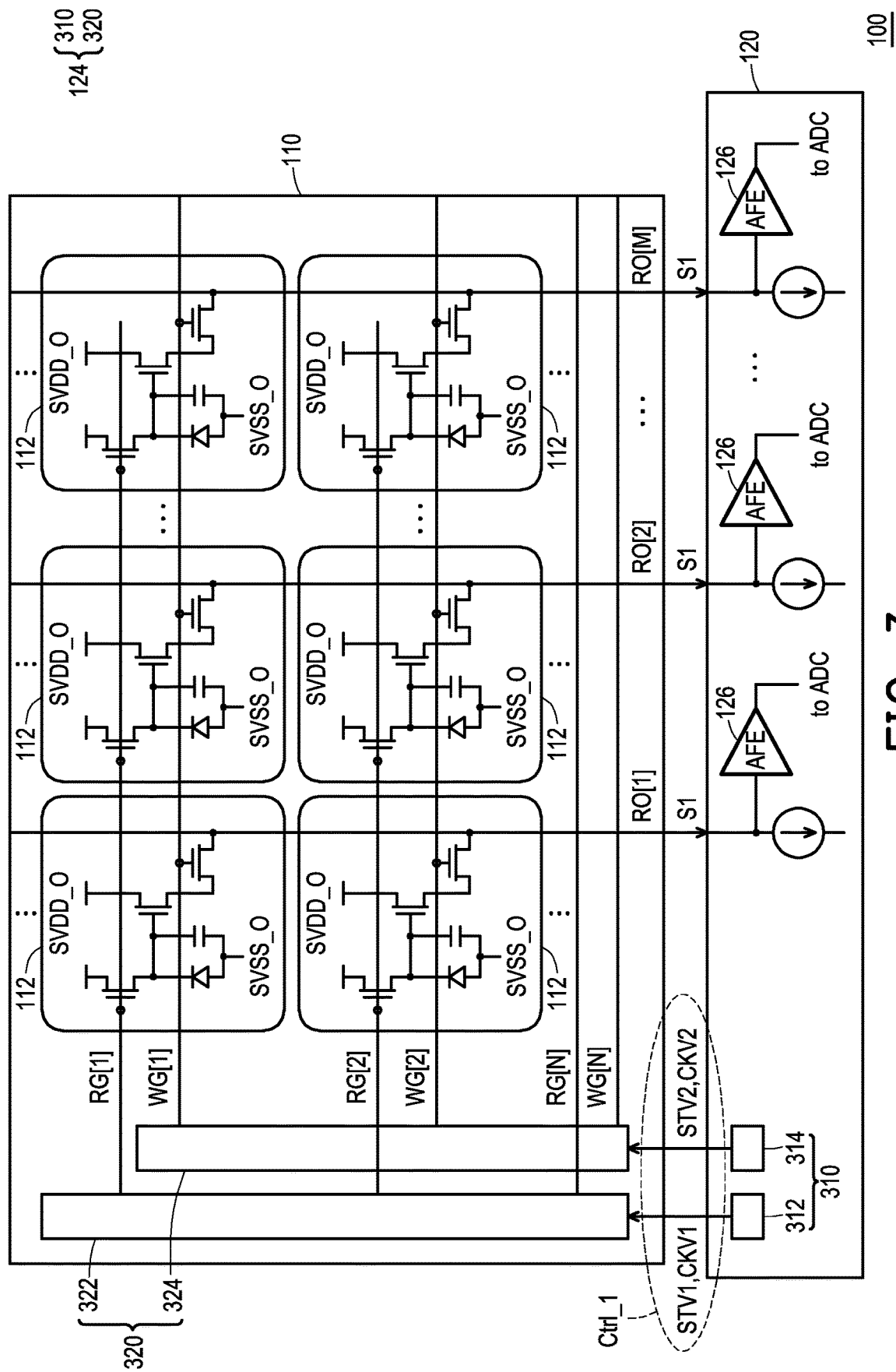
FIG. 3 is a schematic diagram of a fingerprint recognition device according to another embodiment of the invention.
Figure 4:
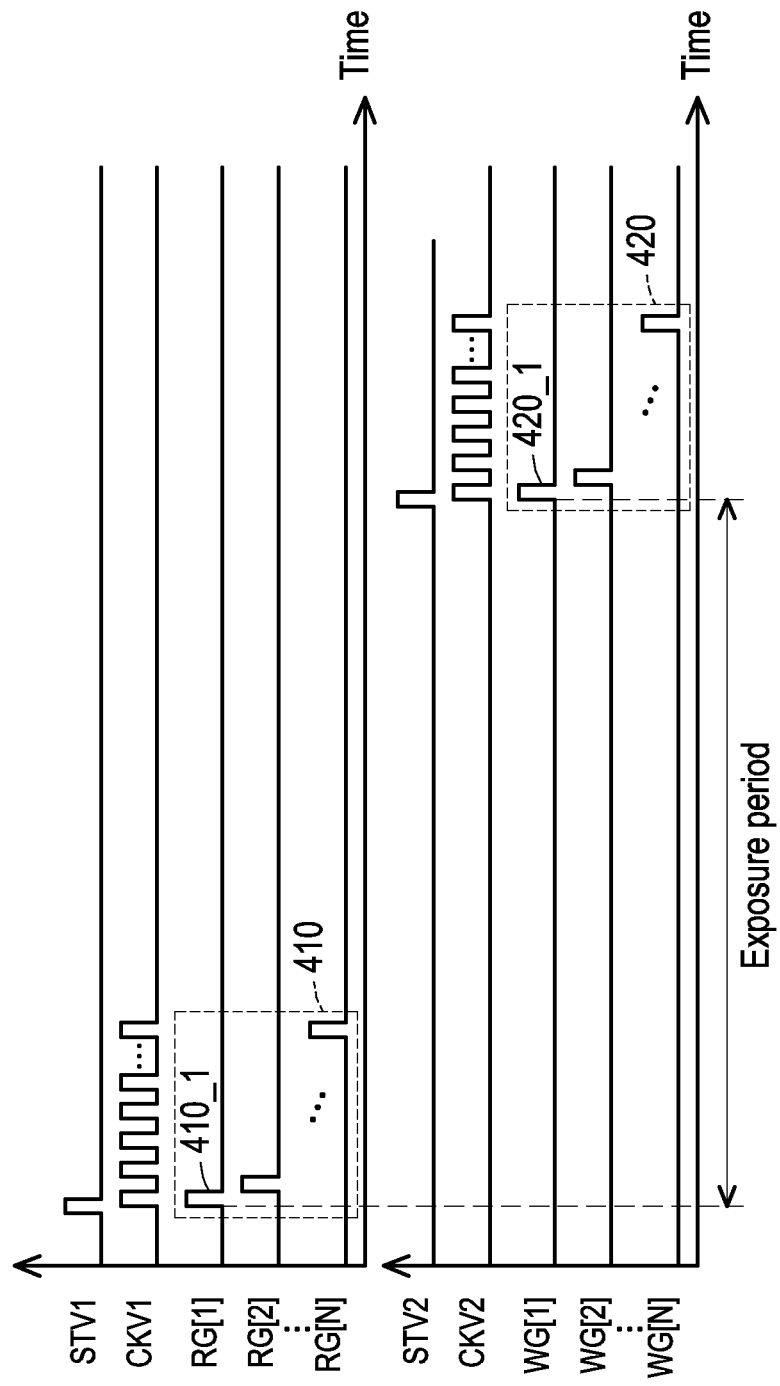
FIG. 4 is a waveform diagram of signals for operating the fingerprint recognition device of FIG. 3 according to an embodiment of the invention.

FIG. 3 is a schematic diagram of a fingerprint recognition device according to another embodiment of the invention. FIG. 4 is a waveform diagram of signals for operating the fingerprint recognition device of FIG. 3 according to an embodiment of the invention. Referring to FIG. 3 and FIG. 4, the sensor panel 110 includes a plurality of sensor pixels 112 arranged in an array. The sensor pixels 112 include optical fingerprint sensors to perform the fingerprint sensing operation. The sensor pixels 112 are configured to output the sensing signals S1 to the readout circuit 120 via sensing lines RO[1] and RO[2] to RO[M], where M is an integer larger than 2. For example, the sensor pixels 112 output the sensing signals S1 to respective AFE circuits 126.

In the present embodiment, the readout circuit 120 further includes a plurality of AFE circuits 126. The AFE circuits 126 are coupled to respective pixel columns. The AFE circuits 126 are configured to receive the sensing signals S1 from the sensor pixels 112. The AFE circuit 126 may be include an analog circuit and/or a digital analog hybrid circuit, and it is responsible for performing many tasks, including signal capture, analog filtering, power amplification, etc. The AFE circuits 126 output the processed sensing signals S1 of the analog format to the ADC circuit 122. In addition, enough teaching, suggestion, and implementation illustration for hardware structures of the AFE circuit 126 can be obtained with reference to common knowledge in the related art.

The driver circuit 124 is coupled to the sensor pixels 112 via first driving lines RG[1] and RG[2] to RG[N] and second driving lines WG[1] and WG[2] to WG[N], where N is an integer larger than 2. The driver circuit 124 is configured to reset the sensor pixels 112 and scan the sensor pixels 112 to drive the sensor pixels 112 to output sensing signals S1.

The driver circuit 124 includes a gate driving circuit 310 and a scan circuit 320. The gate driving circuit 310 is coupled to the scan circuit 320. The scan circuit 320 is coupled to the sensor pixels 112 via the first driving lines RG[1] and RG[2] to RG[N] and the second driving lines WG[1] and WG[2] to WG[N]. In the present embodiment, the scan circuit 320 is disposed on the sensor panel 110, and the gate driving circuit 310 is disposed in the readout circuit 120, but the invention is not limited thereto. In an embodiment, the scan circuit 320 may be disposed in the readout circuit 120.

The gate driving circuit 310 is configured to drive the scan circuit 320 to perform a reset operation and a scan operation. For example, the gate driving circuit 310 may output a control signal Ctrl_1 to drive the scan circuit 320. The control signal Ctrl_1 includes start pulse signals STV1 and STV2 and clock signals CKV1 and CKV2.

The scan circuit 320 is configured to reset the sensor pixels 112 and scan the sensor pixels 112 to drive the sensor pixels 112 to output the sensing signals S1 according to the start pulse signals STV1 and STV2 and the clock signals CKV1 and CKV2.

To be specific, the gate driving circuit 310 includes a first driving circuit 312 and a second driving circuit 314, and the scan circuit 320 includes a reset circuit 322 and a writing circuit 324. The reset circuit 322 and the writing circuit 324 may be gate on array (GOA) circuits disposed on the sensor panel 110. The reset circuit 322 is coupled to the sensor pixels 112 via the first driving lines RG[1] and RG[2] to RG[N]. The writing circuit 324 is coupled to the sensor pixels 112 via the second driving lines WG[1] and WG[2] to WG[N].

The first driving circuit 312 outputs the start pulse signal STV1 and the clock signal CKV1 to the reset circuit 322. The reset circuit 322 outputs reset signals 410 to the first driving lines RG[1] and RG[2] to RG[N] according to the start pulse signal STV1 and the clock signal CKV1 during a reset period, so as to reset the sensor pixels 112 row by row.

The second driving circuit 314 outputs the start pulse signal STV2 and the clock signal CKV2 to the writing circuit 324. The writing circuit 324 outputs readout signals 420 to the second driving lines WG[1] and WG[2] to WG[N] according to the start pulse signal STV2 and the clock signal CKV2 during a readout period, such that the readout circuit 120 reads out the sensing signals S1 from the sensor pixels 112 row by row.

Taking the first pixel row of the sensor pixels 112 for example, the reset signal 410_1 resets the first pixel row of the sensor pixels 112, and then the sensor pixels 112 located on the first pixel row are exposed to sense fingerprint images. Next, the readout signal 420_1 drives the first pixel row of the sensor pixels 112 to output the sensing signals S1 to the readout circuit 120. A time interval between a rising edge of the reset signal 410_1 and a rising edge of the readout signal 420_1 is an exposure period, as depicted in FIG. 4. The exposure period means the time span for which the sensor pixels 112 are exposed to the light so as to record the fingerprint images.

Figure 5:
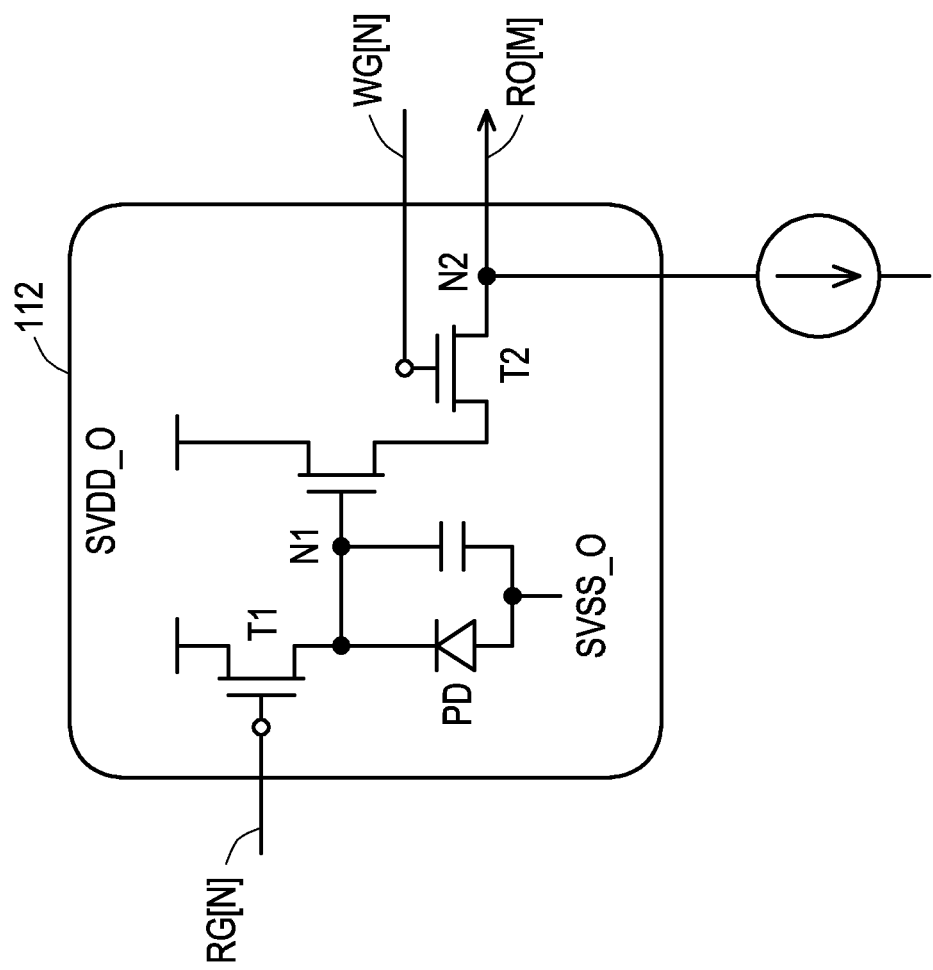
FIG. 5 is a schematic diagram of a sensor pixel according to an embodiment of the invention.
Figure 6:
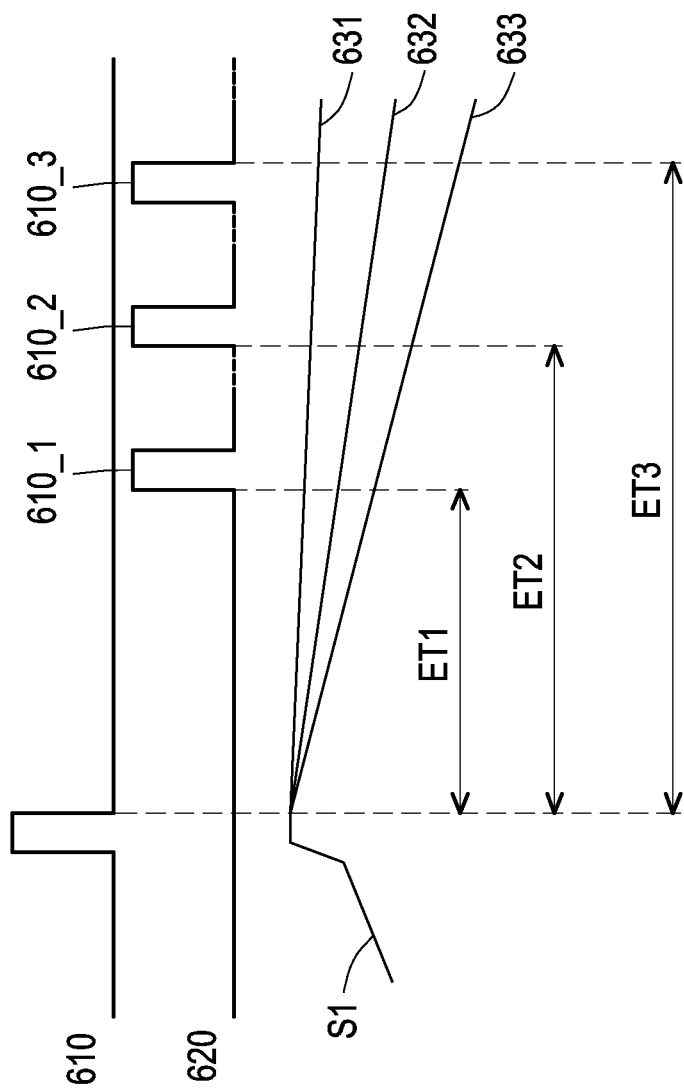
FIG. 6 is a waveform diagram of control signals and sensing signals of the sensor pixel of FIG. 5 according to an embodiment of the invention.

FIG. 5 is a schematic diagram of a sensor pixel according to an embodiment of the invention. FIG. 6 is a waveform diagram of control signals and sensing signals of the sensor pixel of FIG. 5 according to an embodiment of the invention. Referring to FIG. 5 and FIG. 6, the sensor pixel 112 operates between a first operating voltage SVDD_O and a second operating voltage SVSS_O. The reset signal 610 transmitted on the first driving lines RG[N] turns on a transistor T1 during a reset period, and thus a voltage at a node N1 is reset by the first operating voltage SVDD_O. After the reset period, a photodiode PD is exposed to the light so as to record fingerprint images during an exposure period. After the exposure period, the readout signal 620 transmitted on the second driving lines WG[N] turns on a transistor T2 during a readout period, and thus the voltage at the node N1 is transmitted to a node N2. The voltage at the node N2 serves as the sensing signal S1 and is outputted to the readout circuit 120 via the sensing line RO[M].

In the present embodiment, the readout signal 620 includes a plurality of readout pulses 610_1, 610_2 and 610_3, such that the voltage at the node N2 can be readout at different time points after different exposure periods ET1, ET2 and ET3. FIG. 6 illustrates the sensing signal S1 has different discharging rates when the photodiode PD is exposed to different light intensity. For example, the sensing signal S1 has a slow discharging rate as a slope 631 when the photodiode PD does not sense light or senses very weak light. The sensing signal S1 has a fast discharging rate as a slope 633 when the photodiode PD senses strong light. In addition, the sensing signal S1 has a discharging rate between the slops 631 and 633, such as a slope 632, when the photodiode PD senses normal light.

Figure 7:
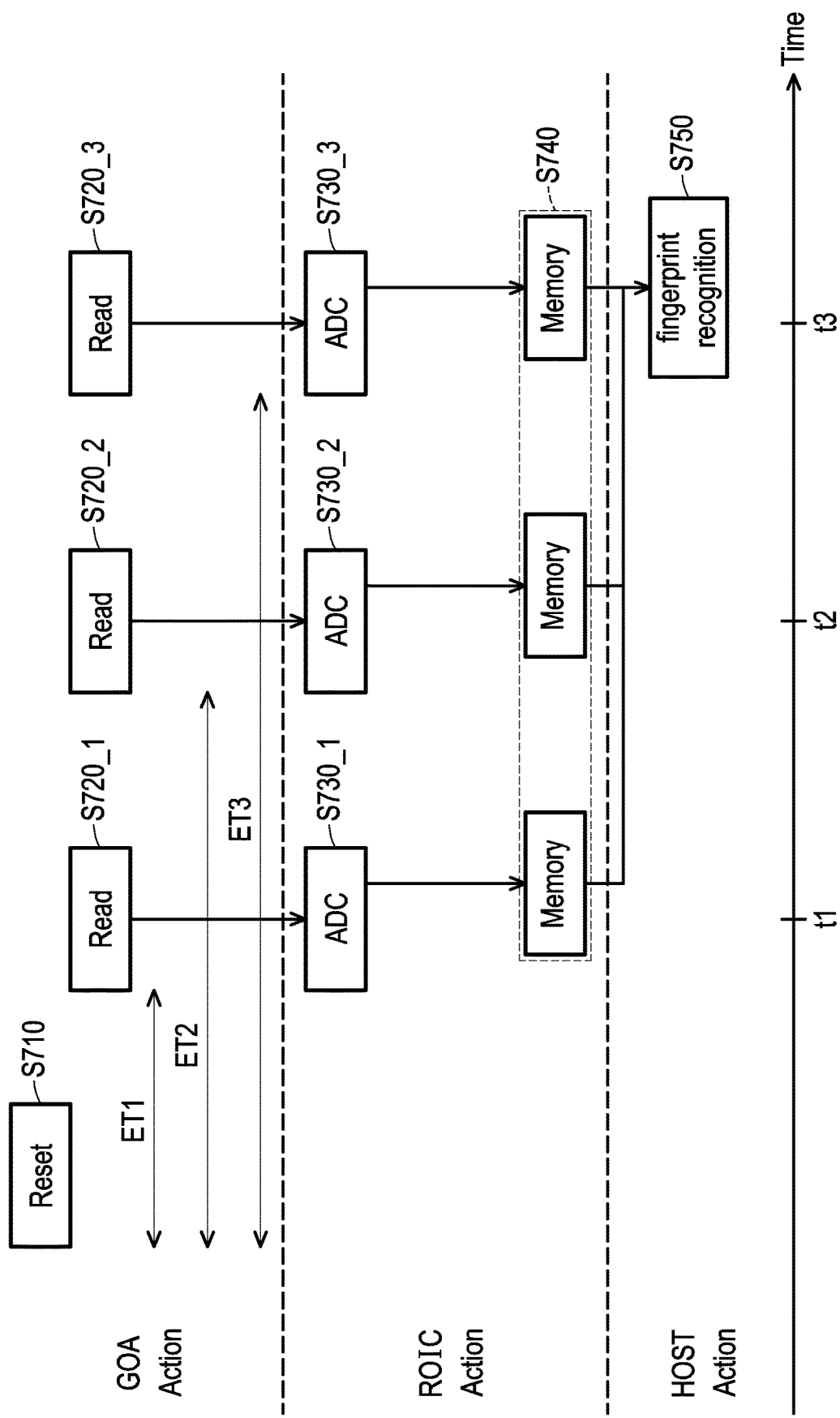
FIG. 7 illustrates a fingerprint sensing and recognition process according to an embodiment of the invention.

FIG. 7 illustrates a fingerprint sensing and recognition process according to an embodiment of the invention. Referring to FIG. 3 and FIG. 7, after the gate driving circuit 310 controls the scan circuit 320 to perform the first reset operation S710 on the sensor pixels 112, the sensor pixels 112 are continuously exposed. Based on different exposure time length settings, the sensing signals S1 are read out at the first readout time point t1 and converted into digital signals by the ADC circuit 122, and then the sensing signals S1 can be read out again at least at the second readout time point t2 and converted into digital signals by the ADC circuit 122 without performing a second reset operation. The sensing signals S1 of the digital format include a first data and a second data. The first data corresponds to a first fingerprint image, and the second data corresponds to a second fingerprint image. In addition, a third fingerprint image may be obtained at the third readout time point t3 in a similar manner.

As illustrated in FIG. 7, the readout circuit 120, e.g. a readout integrated circuit (ROIC), reads out the sensing signals S1 at three readout time points t1, t2 and t3 respectively (operation S720) and converts the sensing signals S1 into digital signals by the ADC circuit 122 (operation S730), but only performs one reset operation. That is to say, the readout circuit 120 reads out the sensing signals S1 from the sensor pixels 112 after a first exposure period ET1 to obtain the first fingerprint image, and read out the sensing signals S1 after a second exposure period ET2 to obtain the second fingerprint image. The sensor pixels 112 are reset before the first exposure period ET1 and after the second exposure period ET2, or even after the third exposure period ET3. The reset operation are not performed between the first readout time point t1 and the third readout time point t3.

The digital fingerprint image signals of multiple fingerprint images are all stored, which can be stored in the readout circuit 120 or the host circuit 130 (operation S740). For example, referring to FIG. 1 and FIG. 2, the readout circuit 120 may include a first storage device (not shown) coupled to the analog-to-digital circuit 126. The first storage device is configured to receive and store the sensing signals S1 of the digital format. Alternatively, the host circuit 130 may include a second storage device (not shown) coupled to the readout circuit 120. The second storage device is configured to receive and store the sensing signals S1 of the digital format.

Next, the host circuit 130 can determine which read data to be used for the fingerprint recognition operation S750. For example, the host circuit 130 can perform the fingerprint recognition operation S750 according to the first fingerprint image, the second fingerprint image and/or the third fingerprint image. In other words, even in a strong light environment or a dry finger sensing condition, the fingerprint recognition device 100 does not need to run a complete fingerprint sensing cycle including a reset operation every time, and thus the unlocking time is saved.

Figure 8:
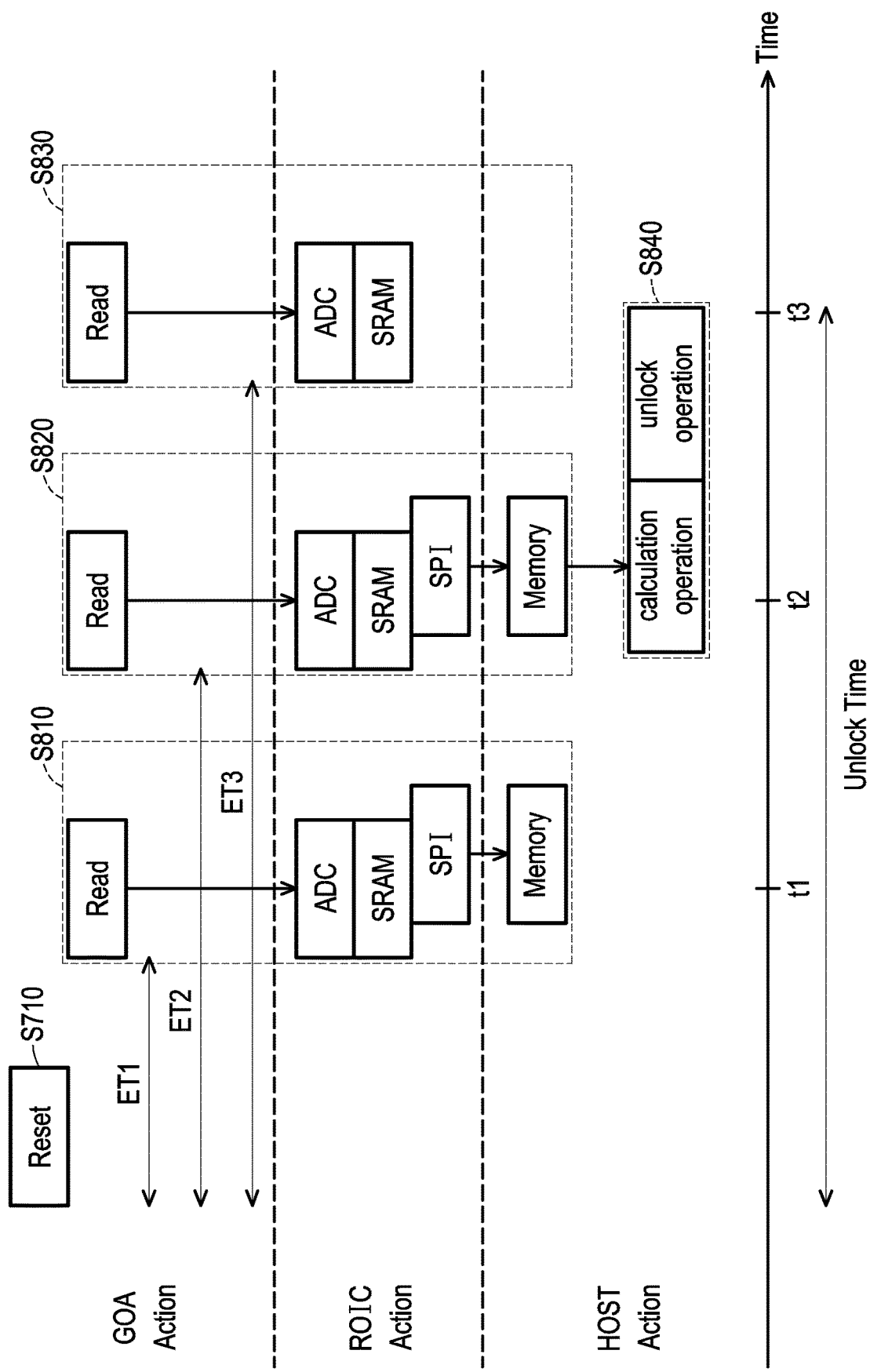
FIG. 8 illustrates a fingerprint sensing and recognition process according to another embodiment of the invention.

FIG. 8 illustrates a fingerprint sensing and recognition process according to another embodiment of the invention. As illustrated in FIG. 8, the host circuit 130 performs the fingerprint recognition operation S840 based on the second fingerprint image. The fingerprint recognition operation S840 includes a calculation operation and an unlock operation. The second fingerprint image is obtained according to the fingerprint sensing operation S840 with the exposure period ET2 and a preset ADC setting (a second setting). The ADC setting is, for example, an input voltage range of the ADC circuit 122.

The obtained second fingerprint image is used for the fingerprint recognition (operation S840). The readout circuit 120 reads out the sensing signals S1 and converts the sensing signals S1 into a digital fingerprint image signal not only after the exposure period ET2, but also after the other two exposure time lengths, i.e. the exposure periods ET1 and ET3. The exposure time length of the exposure period ET1 is shorter than the exposure time length of the exposure period ET2, and the exposure time length of the exposure period ET3 is longer than the exposure time length of the exposure period ET2.

In detail, as illustrated in operation S810, when the exposure period ET1 elapses from a specified pixel row in the sensor panel 110 after the reset operation of the specified pixel row is completed, the readout circuit 120 reads out the sensing signals S1 from the specified pixel row for the first time, and then the sensing signals S1 are converted by the ADC circuit 122 having a first setting to generate the first read data. The first read data is stored in the first storage device, e.g. a Static Random Access Memory (SRAM), of the readout circuit 120 and transmitted to the host circuit 130 through an interface, e.g. a Serial Peripheral Interface (SPI), and stored in the second storage device of the host circuit 130. A complete fingerprint image signal can be obtained by performing the above reset-exposure-readout operations row by row on the sensor panel 110. The digital fingerprint image signal transmission from the readout circuit 120 to the host circuit 130 can be transmitted to the host circuit 130 row by row in real time from the readout circuit 120, or a complete fingerprint image is stored on the readout circuit 120 and then transmitted to the host circuit 130.

When the readout circuit 120 reads out the sensing signals S1 of the specified pixel row for the first time and converts the sensing signal S1 with the ADC circuit 122, the specified pixel row continues to be exposed. As illustrated in operation S820, when the exposure period ET2 elapses from the specified pixel row in the sensor panel 110 after the reset operation of the specified pixel row is completed, the readout circuit 120 reads out the sensing signals S1 from the specified pixel row for the second time, and then the sensing signals S1 are converted by the ADC circuit 122 having the second setting to generate the second read data. The second read data is stored in the first storage device of the readout circuit 120 and transmitted to the host circuit 130 through the interface, and stored in the second storage device of the host circuit 130.

When the readout circuit 120 reads out the sensing signals S1 of the specified pixel row for the second time and converts the sensing signal S1 with the ADC circuit 122, the specified pixel row continues to be exposed. Next, as illustrated in operation S830, the readout circuit 120 reads out the sensing signal S1 of the specified pixel row for the third time after the exposure period ET3 and converts the sensing signal S1 through the ADC circuit 122 having a third setting to generate the third read data, which is transmitted to the host circuit 130, and then stored in the second storage device of the host circuit 130.

It should be noted that since the readout is performed row by row and each pixel row is read out through the same fingerprint sensing lines, the time interval between the end points of each exposure period must be long enough. After the fingerprint image obtained by the exposure period ET1 is read out row by row, the fingerprint image obtained by the exposure period ET2 can be read row by row.

In the embodiment of FIG. 8, the host circuit 130 performs the fingerprint recognition operation according to the second fingerprint image, which is obtained by fingerprint sensing with the exposure period ET2 and the second ADC setting. Under normal circumstances (no over-exposure, or no dry finger touching), the fingerprint recognition operation by the host circuit 130 based on the second fingerprint image obtained by the exposure period ET2 should be able to unlock the fingerprint recognition device 100 after the calculation operation. If the fingerprint recognition device 100 can be successfully unlocked, the first fingerprint image obtained by the exposure period ET2 can be discarded, and the third fingerprint image obtained according to the exposure period ET3 is not required to be used and sent to the host circuit 130.

In the present embodiment, the ADC circuit 122 has different parameter settings for different lengths of exposure periods, and the host circuit 130 is configured to set the parameter settings of the ADC circuit 122 according to the lengths of the exposure periods.

To be specific, depending on the exposure period, the discharge range of the optical fingerprint sensor will be different, that is, the voltage range of the read sensing signal will be different, and the input voltage range of the ADC circuit will be different. For example, after a long time of discharge, the output voltage of the fingerprint sensor read through the sensing line may drop from 5V to 1V. If the ADC setting is to process the input signal with a voltage range of 0-2V, the ADC circuit 122 can accurately capture the input sensing signal and convert it into a digital data.

However, if the discharge time is not enough, the output voltage of the fingerprint sensor only drops from 5V to 4V (outside the voltage range of 0~2V), and then the ADC circuit 122 cannot accurately capture the input sensing signal according to the previous setting. In order to enable the processing input voltage range of the ADC circuit to include the sensed signal level read out, it is necessary to adjust the setting of the ADC. In other words, different exposure time lengths are required to correspond to different ADC settings. The setting of the ADC circuit can be determined by the host circuit 130, and the host circuit 130 can store several groups of ADC settings in advance.

Figure 9:
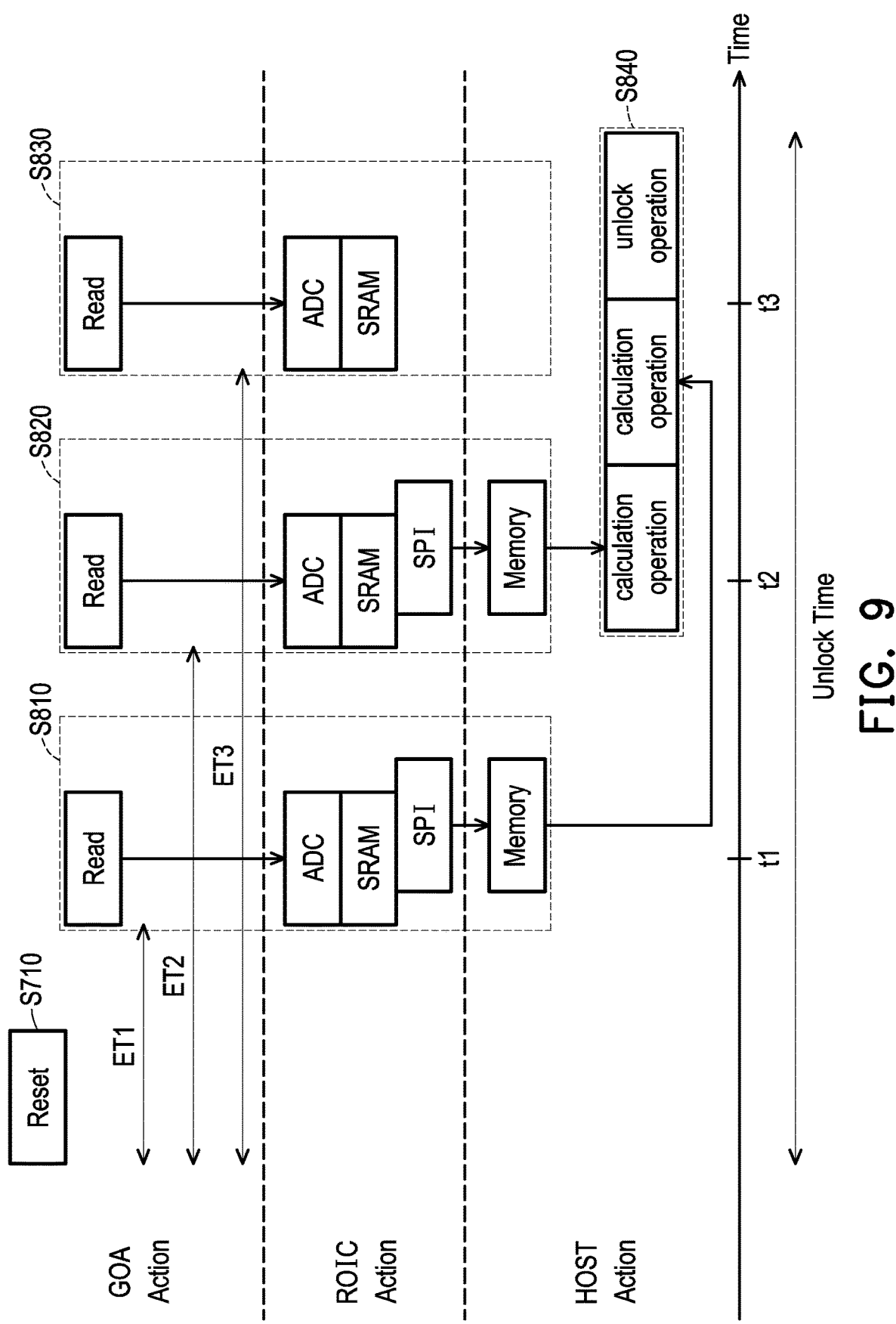
FIG. 9 illustrates a fingerprint sensing and recognition process according to another embodiment of the invention.

FIG. 9 illustrates a fingerprint sensing and recognition process according to another embodiment of the invention. In the embodiment of FIG. 9, the host circuit 130 performs the fingerprint recognition operation according to the second fingerprint image obtained by fingerprint sensing with the exposure period ET2 and the second ADC setting. However, in a strong light environment, the second fingerprint image may be an overexposed image, which causes the host circuit 130 to perform the fingerprint recognition operation according to the fingerprint image obtained by exposure period ET2, but it is found that the fingerprint recognition device 100 cannot be unlocked after the calculation operation. At this time, the host circuit 130 may unlock the fingerprint recognition device 100 by changing another fingerprint image. As illustrated in FIG. 9, the host circuit 130 uses the first fingerprint image obtained according to the exposure period ET1 for the fingerprint recognition operation, and after the calculation operation is completed, the unlocked operation is successful. The third fingerprint image obtained according to the exposure period ET3 does not need to be used.

As illustrated in FIG. 9, it is assumed that the exposure period ET1 is 110 milliseconds (ms), the exposure period ET2 is 150 ms, and the time required for the calculation operation is 100 ms. In this case, it takes 150+100+110+100=460 ms to unlock using the traditional method. However, the unlocking time using the method of the embodiment is only 150+100+100=350 ms. Alternatively, in other embodiments, when the host circuit 130 performs the fingerprint recognition operation according to the second fingerprint image obtained by the exposure period ET2, and it is found that the fingerprint recognition device 100 cannot be unlocked, the host circuit 130 may still maintain the second fingerprint image, and perform an image process on the first fingerprint image and the second fingerprint image to obtain a post-processed fingerprint image containing two image components, which is then used for the fingerprint recognition operation. The noise in the post-processed fingerprint image may be reduced, thereby improving the probability of successful unlocking.

If the color information of the image data (for example, 12 bits) of the complete fingerprint image exceeds a certain percentage (for example, 40%) and is above the maximum value (for example, 4095), it can be determined that the fingerprint image is overexposed. In addition, the data read from the fingerprint sensor array can be stored in the second memory of the host circuit 130, or registered in the first memory of the readout circuit 120, and then stored in the second memory of the host circuit 130 through the interface when the host circuit 130 needs the data.

Figure 10:
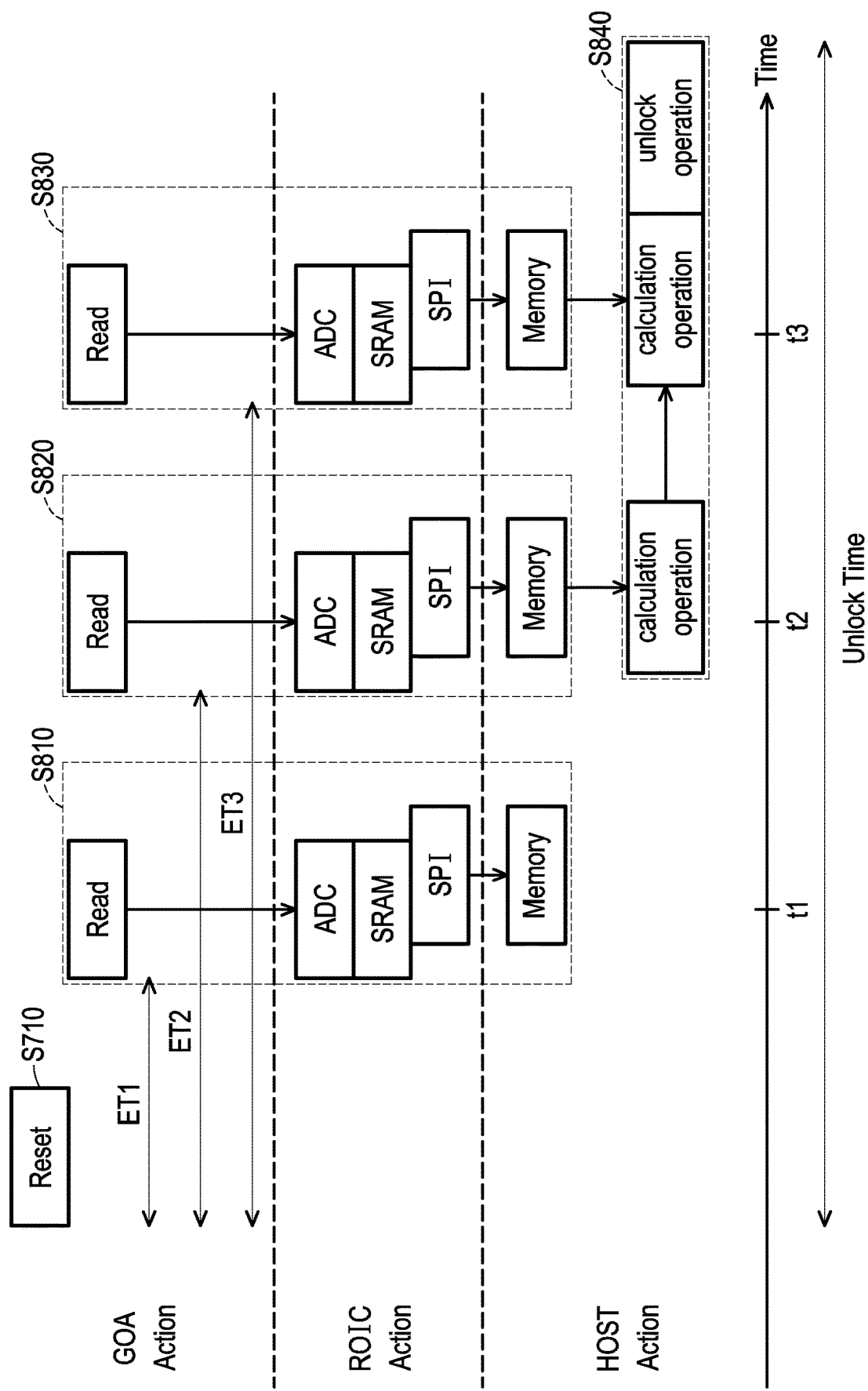
FIG. 10 illustrates a fingerprint sensing and recognition process according to another embodiment of the invention.

FIG. 10 illustrates a fingerprint sensing and recognition process according to another embodiment of the invention. In the embodiment of FIG. 10, the host circuit 130 performs the fingerprint recognition operation according to the second fingerprint image obtained by fingerprint sensing with the exposure period ET2 and the second ADC setting. The readout circuit 120 reads out the sensing signals S1 and converts the sensing signals S1 into a digital fingerprint image signal not only after the exposure period ET2, but also after the other two exposure time lengths, i.e. the exposure periods ET1 and ET3.

In the embodiment of FIG. 10, the host circuit 130 performs the fingerprint recognition operation based on the second fingerprint image obtained by fingerprint sensing with the exposure period ET2 and the second ADC setting. However, in a dry environment, the surface of the finger shrinks, and thus the resolution between peaks and valleys is not good in a fingerprint image, so that the host circuit 130 cannot unlocked the fingerprint recognition device 100 based on the second fingerprint image obtained by the exposure period ET2. The third fingerprint image obtained according to the exposure period ET3 (longer than the exposure period ET2) is used for the fingerprint recognition operation, and the fingerprint recognition device 100 may be unlocked successfully after the calculation operation.

As illustrated in FIG. 10, it is assumed that the exposure period ET2 is 150 ms, the exposure period ET3 is 200 ms, and the time required for the calculation operation is 100 ms. In this case, it takes 150+100+200+100=550 ms to unlock using the traditional method. However, the unlocking time using the method of the embodiment is only 150+100+100=350 ms. In other embodiments, when the host circuit 130 performs the fingerprint recognition operation according to the second fingerprint image obtained by the exposure period ET2, and it is found that the fingerprint recognition device 100 cannot be unlocked, the host circuit 130 may perform an image process on the third fingerprint image and at least one image obtained earlier, i.e. at least one of the first fingerprint image and the second fingerprint image, to obtain a post-processed fingerprint image containing (more than) two image components, which is then used for the fingerprint recognition operation. The noise in the post-processed fingerprint image may be reduced, thereby improving the probability of successful unlocking.

It should be noted that, although it takes three different exposure time lengths as an example in the above-mentioned embodiments, two readout time points can be determined based on only two different exposure time lengths in other embodiments of the disclosure, so as to perform the readout operation twice in a time-division manner, and store the obtained digital data. That is to say, the number of readings can be designed according to actual requirements. In the embodiment where the two readout time points are determined based on two different exposure time lengths, the two different exposure time lengths can be set to be suitable for operation in a normal environment and operation in a strong light environment.

Figure 11:
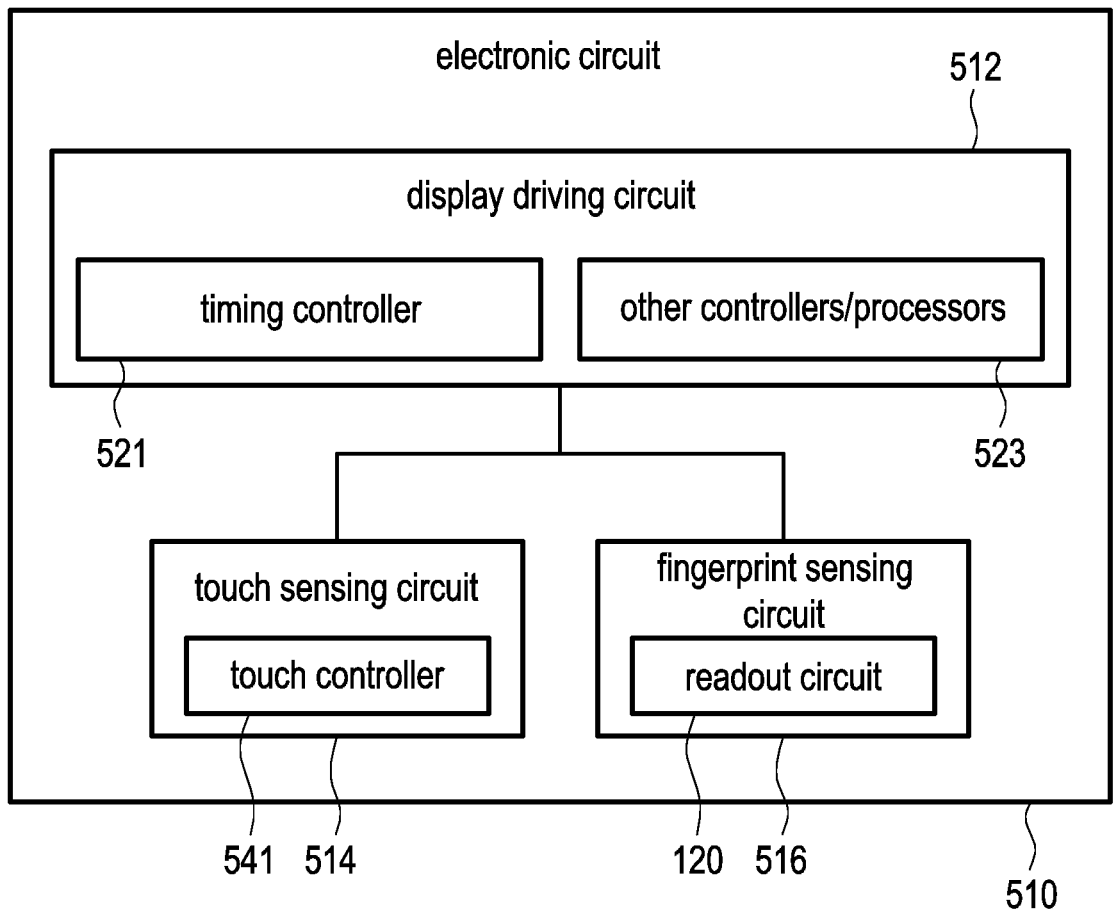
FIG. 11 is a schematic block diagram illustrating an electronic circuit depicted according to an embodiment of the invention.

FIG. 11 is a schematic block diagram illustrating an electronic circuit depicted according to an embodiment of the invention. Referring to FIG. 11, the electronic circuit 510 may is adapted to drive a display panel having a display function, a touch sensing function and a fingerprint sensing function. The electronic circuit 510 includes a display driving circuit 512, a touch sensing circuit 514, and a fingerprint sensing circuit 516.

The display driving circuit 512 is configured to drive and control display pixels of the display panel to display images. The display driving circuit 512 generates display driving signals for driving the display panel 120. The display driving circuit 512 may include a timing controller 521, a display driver and other functional circuits for a display operation. The display driving circuit 512 may also include other controllers or processors 523 for other control activities of the display operation.

The touch sensing circuit 514 is configured to drive and control touch sensors of the display panel to sense the touch event of the display panel. The touch sensing circuit 514 may include a touch controller 541, an AFE circuit, an ADC circuit and other functional circuits for a touch sensing operation.

The fingerprint sensing circuit 516 is configured to drive and control fingerprint sensors of the display panel, e.g. the sensor pixels 112 of FIG. 3, to sense fingerprint images on the display panel via the first driving lines RG[1] and RG[2] to RG[N], the second driving lines WG[1] and WG[2] to WG[N], and the sensing lines RO[1] and RO[2] to RO[M]. The readout circuit 120 receives the sensing signals S1 corresponding to fingerprint images from the sensor pixels 112. The fingerprint sensing circuit 516 may include the readout circuit 120. The readout circuit 120 is implemented in a semiconductor chip which has a display driving function, a touch sensing function and a fingerprint sensing function. The fingerprint sensing circuit 516 may also process the sensing signals S1 to obtain the fingerprint images. The fingerprint sensing circuit 516 may include a digital circuit, an AFE circuit, an ADC circuit and other functional circuits for the fingerprint sensing operation.

In an embodiment, when the electronic circuit 510 is implemented as a single chip integrated circuit that can drive and control the display panel to perform the display operation, the touch sensing operation and the fingerprint sensing operation, the electronic circuit 510 may include a control circuit. The control circuit 530 may be a micro-controller based core to perform all of control activities of the display operation, the touch sensing operation and the fingerprint sensing operation. The control circuit 530 may include at least one of the timing controller 521, the touch controller 541, the digital circuit of the fingerprint sensing circuit 516, and the other controllers or processors 523 of the display driving circuit 512.

The display driving circuit 512, the touch sensing circuit 514 and the fingerprint sensing circuit 516 communicate with one another via signal transmission interfaces, such as Mobile Industry Processor Interface (MIPI), Inter-Integrated Circuit (I2C) Interface, Serial Peripheral Interface (SPI) and/or other similar or suitable interfaces.

Regarding hardware structures of the components in the embodiment of FIG. 3, the timing controller 521, the touch controller 541 and the digital circuit 561 may be a processor having computational capability. Alternatively, the timing controller 521, the touch controller 541 and the digital circuit 561 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC).

In addition, enough teaching, suggestion, and implementation illustration for hardware structures of the display driving circuit 512, the touch sensing circuit 514 and the fingerprint sensing circuit 516 can be obtained with reference to common knowledge in the related art, which is not repeated hereinafter.

Figure 12:
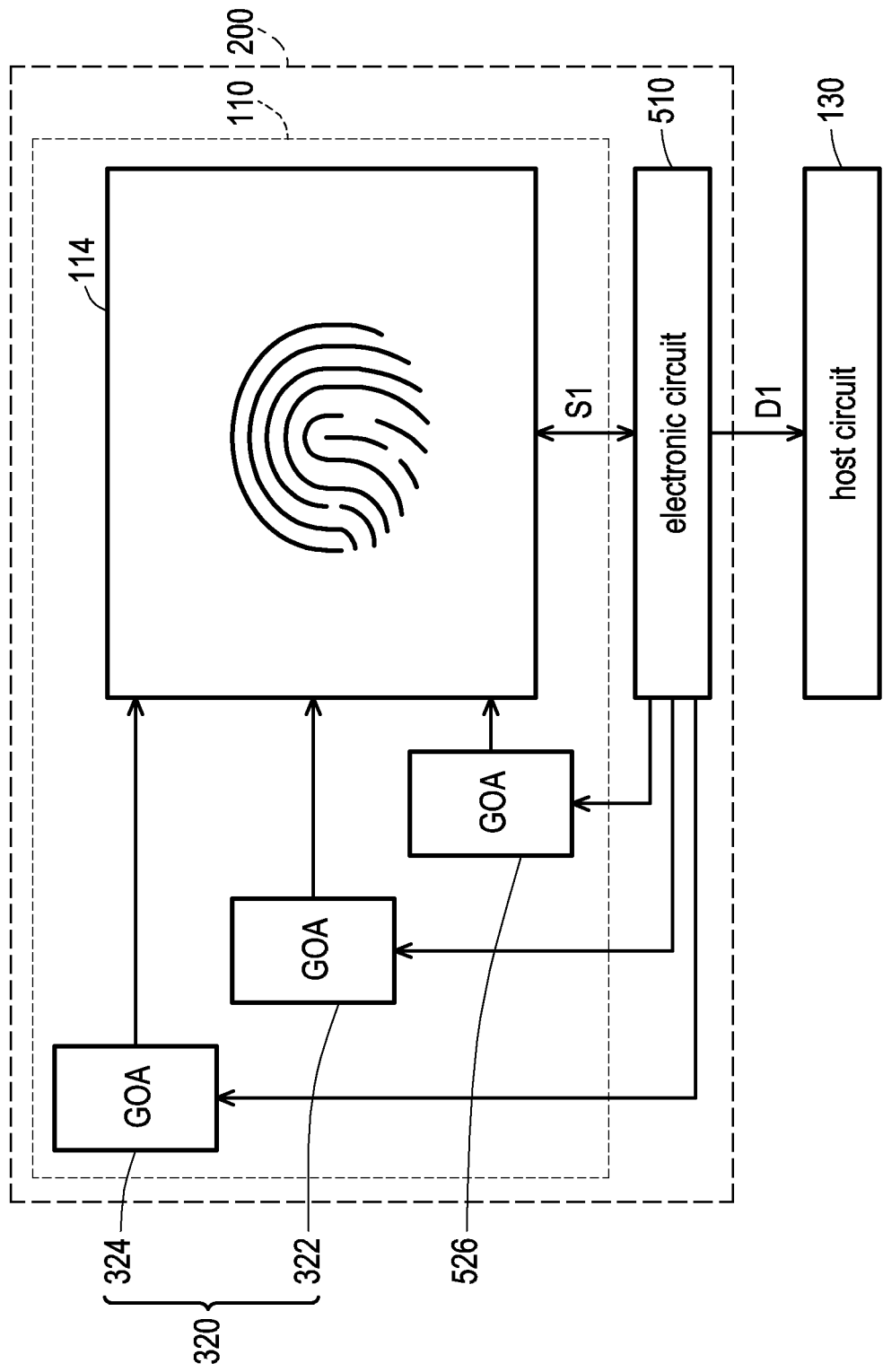
FIG. 12 is a schematic diagram of a fingerprint recognition device according to another embodiment of the invention.

FIG. 12 is a schematic diagram of a fingerprint recognition device according to another embodiment of the invention. Referring to FIG. 12, the fingerprint recognition device 100 of the present embodiment includes the sensor panel 110, the electronic circuit 510 and the host circuit 130. The sensor panel 110 has the display function, the touch sensing function and the fingerprint sensing function. The electronic circuit 510 is configured to drive and control the sensor panel 110 to perform the display operation, the touch sensing operation and the fingerprint sensing operation. The sensor panel 110 and the electronic circuit 510 may serve as the fingerprint sensing device 200 to sense fingerprint images and output the sensing data D1 to the host circuit 130.

In the present embodiment, a scan circuit 526 may be a GOA circuit disposed on the sensor panel 110 for driving a pixel array 114 to perform the display operation. The electronic circuit 510 drives and controls an operation of the scan circuit 526. In an embodiment, the scan circuits 320 and 526 may be disposed in the electronic circuit 510.

Figure 13:
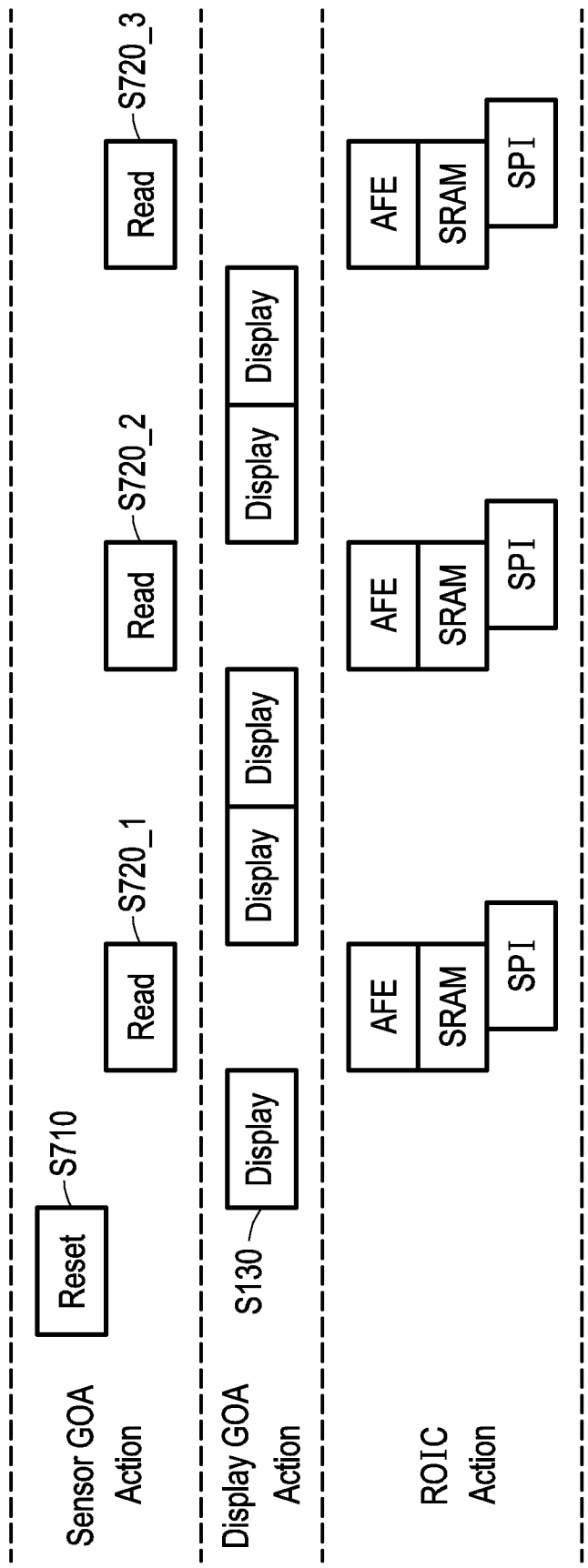
FIG. 13 illustrates a fingerprint sensing and recognition process of FIG. 12 according to an embodiment of the invention.
Figure 14:
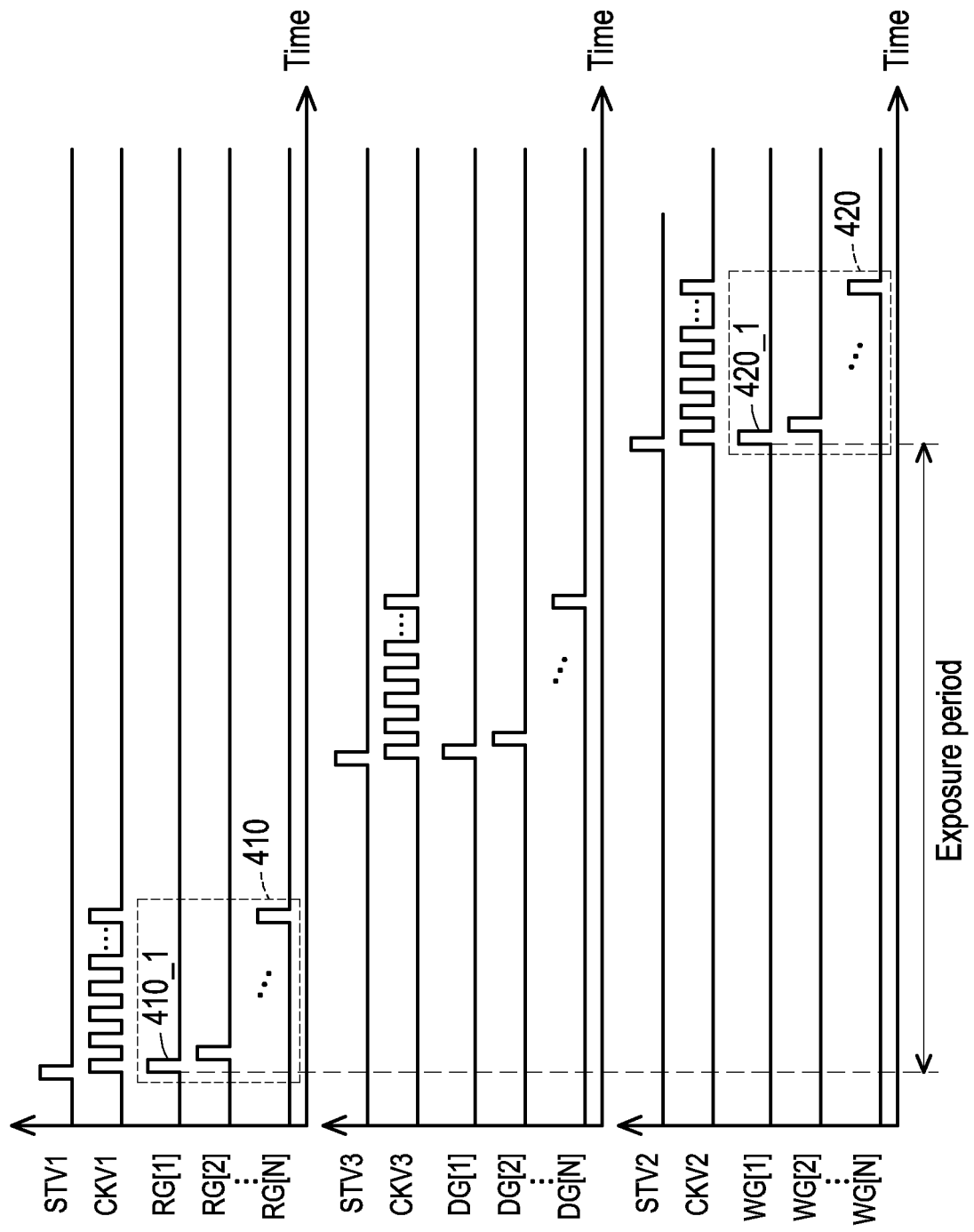
FIG. 14 is a waveform diagram of signals for operating the fingerprint recognition device of FIG. 12 according to an embodiment of the invention.

FIG. 13 illustrates a fingerprint sensing and recognition process of FIG. 12 according to an embodiment of the invention. FIG. 14 is a waveform diagram of signals for operating the fingerprint recognition device of FIG. 12 according to an embodiment of the invention.

Referring to FIG. 12 to FIG. 14, display scanning operations S130 are performed between the first reset operation S710 and the read operation S720_1, or between two of the read operations S720_1, S720_2 and S730_3. In FIG. 14, the scan circuit 526 may scan the pixel array 114 via driving lines DG[1] and DG[2] to DG[N] according to a start pulse signal STV3 and a clock signal CKV3 after the reset operation of the pixel array 114 is completed.

Figure 15:
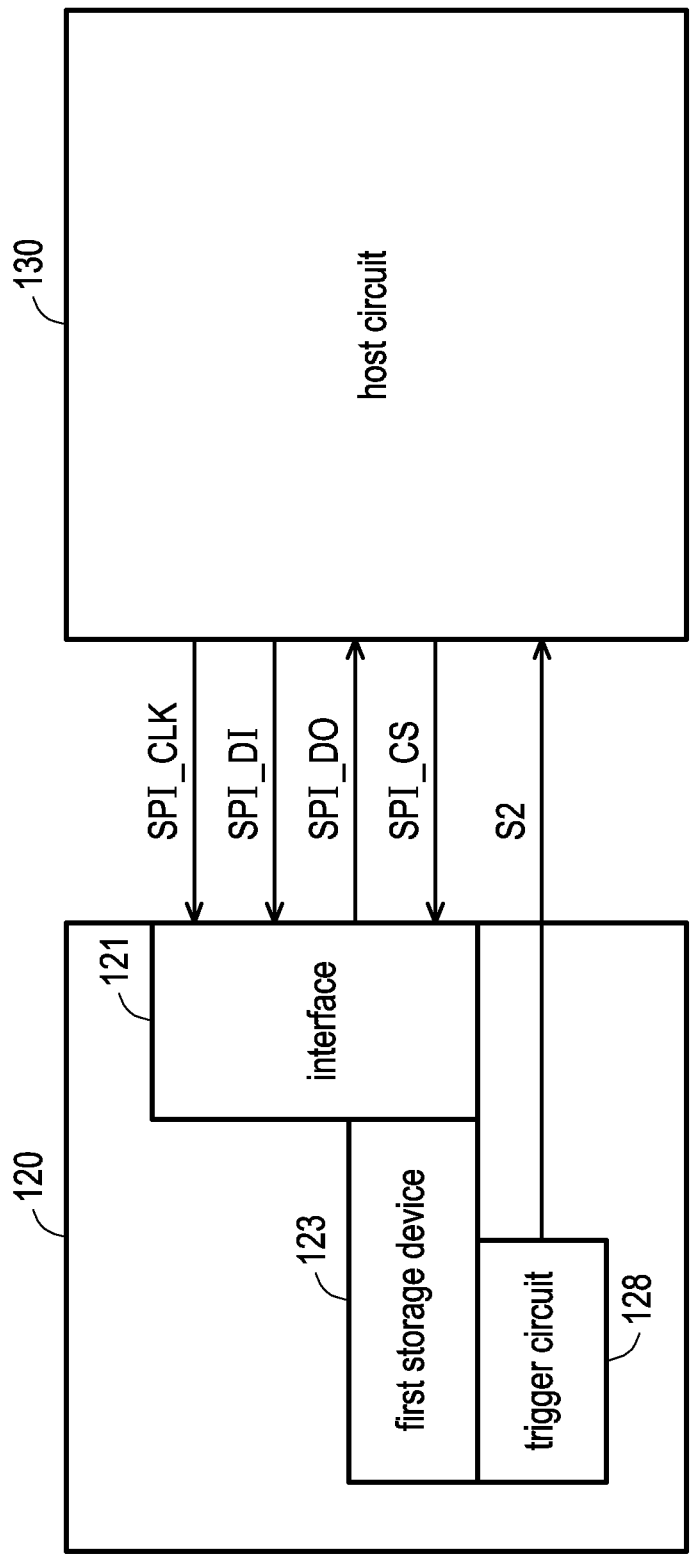
FIG. 15 illustrates a signal transmission operation between the readout circuit and the host circuit according to an embodiment of the invention.
Figure 16:
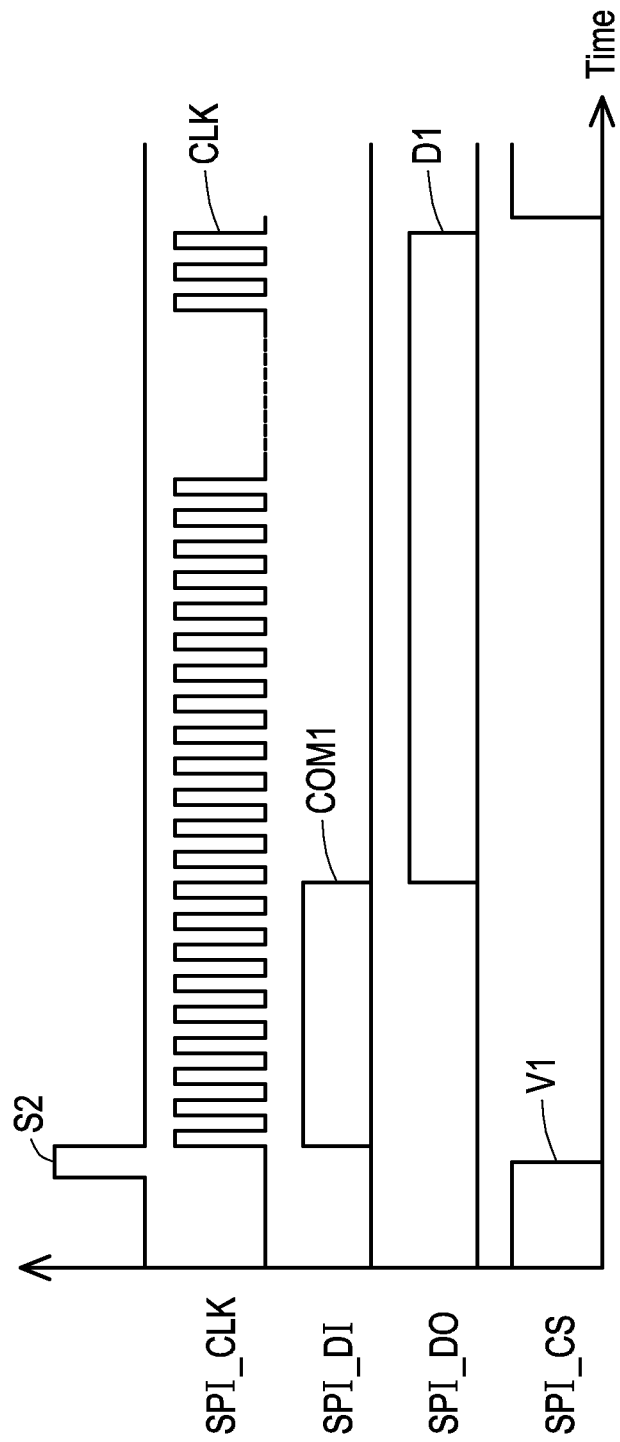
FIG. 16 is a waveform diagram of signals transmitted between the readout circuit and the host circuit of FIG. 15 according to an embodiment of the invention.

FIG. 15 illustrates a signal transmission operation between the readout circuit and the host circuit according to an embodiment of the invention. FIG. 16 is a waveform diagram of signals transmitted between the readout circuit and the host circuit of FIG. 15 according to an embodiment of the invention.

Referring to FIG. 15 and FIG. 16, an interface 121 between the readout circuit 120 and the host circuit 130 may be a serial peripheral interface (SPI), but the invention is not limited thereto. When the readout circuit 120 finishes receiving the data from the display panel 110 via the AFE circuit 126 of FIG. 3, a trigger circuit 128 outputs a signal S2 to trigger the host circuit 130 to inform that host circuit 130 can start to fetch data. In an embodiment, the data received from the display panel 110 may be stored in first storage device 123, e.g. SRAM. Next, the host circuit 130 pulls a voltage V1 at a signal line SPI_CS to be low, and outputs a clock signal CLK via a signal line SPI_CLK. At the same time, the host circuit 130 outputs the read command COM1 on a signal line SPI_DI to the readout circuit 120, and the readout circuit 120 uploads the data D1 on a signal line SPI_DO. Therefore, the host circuit 130 can start receiving data from the readout circuit 120.

Figure 17:
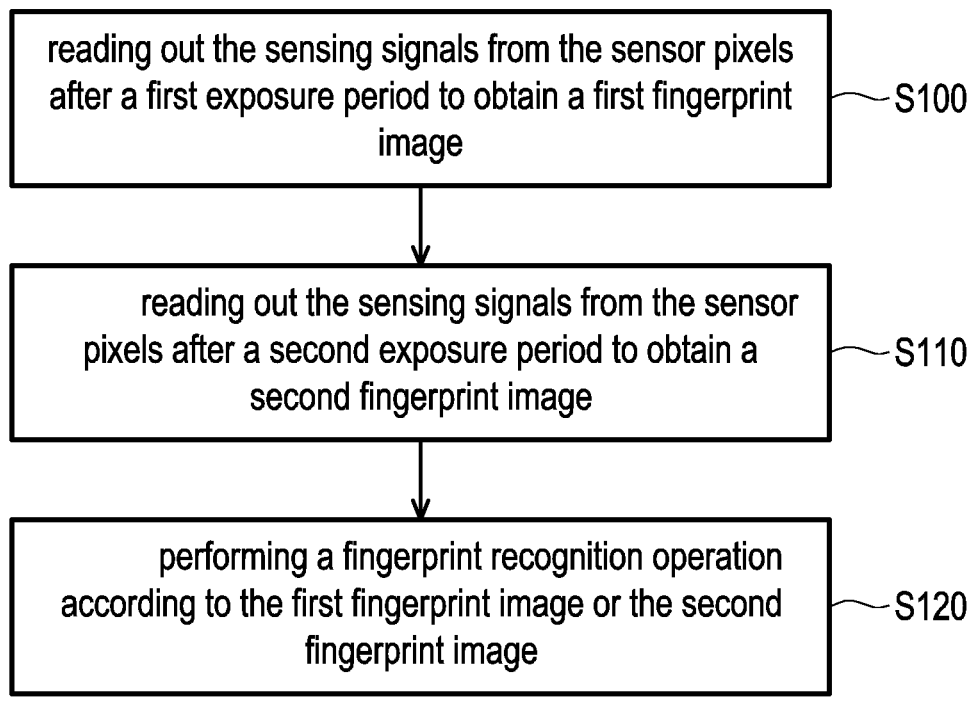
FIG. 17 is a flowchart illustrating an operating method of a fingerprint recognition device according to an embodiment of the invention.

FIG. 17 is a flowchart illustrating an operating method of a fingerprint recognition device according to an embodiment of the invention. Referring to FIG. 1 and FIG. 17, the operating method of the present embodiment is at least adapted to the fingerprint recognition device 100 depicted in FIG. 1, but the disclosure is not limited thereto.

Taking the fingerprint recognition device 100 for example, in step S100, the readout circuit 120 reads out the sensing signals S1 from the sensor pixels 110 after the first exposure period ET1 to obtain a first fingerprint image. In step S110, the readout circuit 120 reads out the sensing signals S1 from the sensor pixels 110 after the second exposure period ET2 to obtain a second fingerprint image. In step S120, the host circuit 130 performs a fingerprint recognition operation according to the first fingerprint image or the second fingerprint image. The sensor pixels 112 are reset before the first exposure period ET1 and after the second exposure period ET2.

The operating method of the fingerprint recognition device described in the embodiment of the invention is sufficiently taught, suggested, and embodied in the embodiments illustrated in FIG. 1 to FIG. 16, and therefore no further description is provided herein.

In summary, in the embodiments of the invention, the readout circuit reads out the sensing signals at some readout time points respectively and converts the sensing signals into digital signals by the ADC circuit, but only performs one reset operation. The ADC circuit has different parameter settings for different lengths of exposure periods. The digital fingerprint image signals of multiple fingerprint images are all stored, which can be stored in the readout circuit or the host circuit. The host circuit can determine which read data to be used for the fingerprint recognition operation. Therefore, even in a strong light environment or a dry finger sensing condition, the fingerprint recognition device does not need to run a complete fingerprint sensing cycle including a reset operation every time, and thus the unlocking time is saved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fingerprint recognition device, comprising:
   a sensor panel, comprising a plurality of sensor pixels arranged in an array, wherein the sensor pixels are configured to output sensing signals;
   a readout circuit, coupled to the sensor pixels, and configured to read out the sensing signals from the sensor pixels after a first exposure period at a first time point to obtain a first fingerprint image, and read out the sensing signals after a second exposure period at a second time point to obtain a second fingerprint image, wherein the sensor pixels are reset before the first exposure period and after the second exposure period, and the sensor pixels are not reset between the first time point and the second time point; and
   a host circuit, coupled to the readout circuit, and configured to perform a fingerprint recognition operation according to the first fingerprint image or the second fingerprint image.

2. The fingerprint recognition device of claim 1, wherein the readout circuit comprises:
   an analog-to-digital converter circuit, coupled to the sensor pixels, and configured to convert the sensing signals from an analog format to a digital format, and output the sensing signals of the digital format,
   wherein the sensing signals of the digital format comprise a first data and a second data, the first data corresponds to the first fingerprint image, and the second data corresponds to the second fingerprint image.

3. The fingerprint recognition device of claim 2, wherein the analog-to-digital converter circuit has different parameter settings for different lengths of exposure periods.

4. The fingerprint recognition device of claim 3, wherein the host circuit is configured to set the parameter settings of the analog-to-digital converter circuit according to the lengths of the exposure periods.

5. The fingerprint recognition device of claim 2, wherein the readout circuit further comprises:

a first storage device, coupled to the analog-to-digital circuit, and configured to receive and store the sensing signals of the digital format.

6. The fingerprint recognition device of claim 2, wherein the host circuit comprises:
a second storage device, coupled to the readout circuit, and configured to receive and store the sensing signals of the digital format.

7. The fingerprint recognition device of claim 1, further comprising:
a driver circuit, coupled to the sensor pixels, and configured to reset the sensor pixels and scan the sensor pixels to drive the sensor pixels to output sensing signals, wherein the driver circuit resets the sensor pixels before the first exposure period and after the second exposure period.

8. The fingerprint recognition device of claim 7, wherein the driver circuit comprises:
a scan circuit, coupled to the sensor pixels, and configured to reset the sensor pixels and scan the sensor pixels to drive the sensor pixels to output the sensing signals; and
a gate driving circuit, coupled to the scan circuit, and configured to drive the scan circuit to perform a reset operation and a scan operation.

9. The fingerprint recognition device of claim 8, wherein the scan circuit is disposed on the sensor panel, and the gate driving circuit is disposed in the readout circuit.

10. The fingerprint recognition device of claim 1, wherein the readout circuit is implemented in a semiconductor chip which has a display driving function, a touch sensing function and a fingerprint sensing function.

11. A readout circuit, configured to read out sensing signals from sensor pixels of a sensor panel, and the readout circuit comprising:
an analog-to-digital converter circuit, coupled to the sensor pixels, and configured to receive the sensing signals from the sensor pixels after a first exposure period at a first time point and after a second exposure period at a second time point, convert the sensing signals from an analog format to a digital format, and output the sensing signals of the digital format; and
a driver circuit, coupled to the sensor pixels, and configured to reset the sensor pixels and scan the sensor pixels to drive the sensor pixels to output the sensing signals, wherein the driver circuit resets the sensor pixels before the first exposure period and after the second exposure period, and do not reset the sensor pixels between the first time point and the second time point.

12. The readout circuit of claim 11, wherein the sensing signals of the digital format comprise a first data and a second data, the first data corresponds to the first fingerprint image, and the second data corresponds to the second fingerprint image.

13. The readout circuit of claim 12, wherein the analog-to-digital converter circuit has different parameter settings for different lengths of exposure periods.

14. The readout circuit of claim 13, wherein the parameter settings of the analog-to-digital converter circuit are set according to the lengths of the exposure periods.

15. The readout circuit of claim 12, wherein the readout circuit further comprises:
a storage device, coupled to the analog-to-digital circuit, and configured to receive and store the sensing signals of the digital format.

16. The readout circuit of claim 11, wherein the driver circuit comprises:

a scan circuit, coupled to the sensor pixels, and configured to reset the sensor pixels and scan the sensor pixels to drive the sensor pixels to output the sensing signals; and
a gate driving circuit, coupled to the scan circuit, and configured to drive the scan circuit to perform a reset operation and a scan operation.

17. The readout circuit of claim 16, wherein the scan circuit is disposed on the sensor panel, and the gate driving circuit is disposed in the readout circuit.

18. The readout circuit of claim 11, wherein the readout circuit is implemented in a semiconductor chip which has a display driving function, a touch sensing function and a fingerprint sensing function.

19. An operating method of a fingerprint recognition device, wherein the fingerprint recognition device comprises a sensor panel, and the sensor panel comprises a plurality of sensor pixels configured to output sensing signals, the operating method of the fingerprint recognition device comprising:
reading out the sensing signals from the sensor pixels after a first exposure period at a first time point to obtain a first fingerprint image;
reading out the sensing signals from the sensor pixels after a second exposure period at a second time point to obtain a second fingerprint image; and
performing a fingerprint recognition operation according to the first fingerprint image or the second fingerprint image, wherein the sensor pixels are reset before the first exposure period and after the second exposure period, and the sensor pixels are not reset between the first time point and the second time point.

20. The operating method of the fingerprint recognition device of claim 19, wherein the fingerprint recognition device comprises a readout circuit, and the operating method of the fingerprint recognition device further comprises:
converting, via an analog-to-digital converter of the readout circuit, the sensing signals from an analog format to a digital format, and outputting the sensing signals of the digital format,
wherein the sensing signals of the digital format comprise a first data and a second data, the first data corresponds to the first fingerprint image, and the second data corresponds to the second fingerprint image.

21. The operating method of the fingerprint recognition device of claim 20, further comprising:
setting parameter settings of the analog-to-digital converter circuit according to lengths of exposure periods.

22. The operating method of the fingerprint recognition device of claim 20, further comprises:
storing the sensing signals of the digital format in a first storage device of the readout circuit.

23. The operating method of the fingerprint recognition device of claim 20, wherein the fingerprint recognition device comprises a host circuit, and the operating method of the fingerprint recognition device further comprises:
storing the sensing signals of the digital format in a second storage device of the host circuit.

24. The operating method of the fingerprint recognition device of claim 19, further comprising:
resetting the sensor pixels before the first exposure period and after the second exposure period, and scanning the sensor pixels to drive the sensor pixels to output sensing signals.

* * * * *